M. F. WHITE.
Plows.
No. 153,646. Patented July 28, 1874.
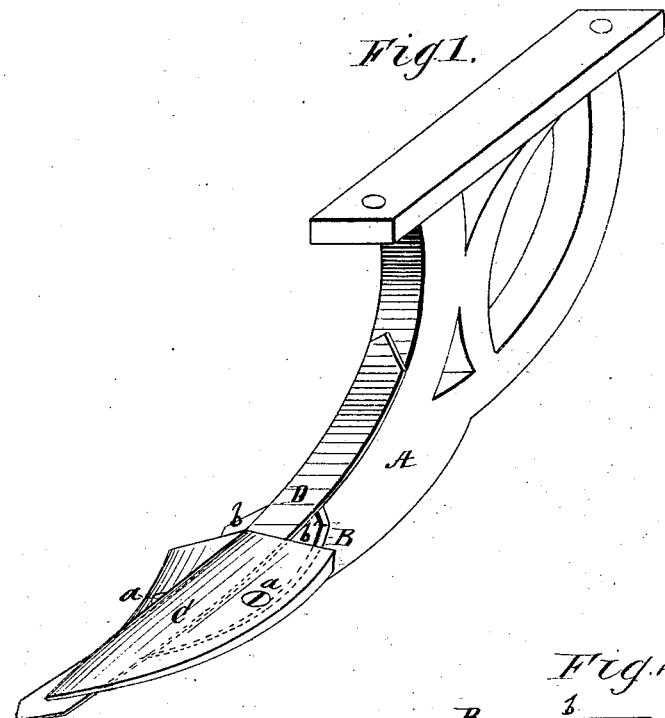
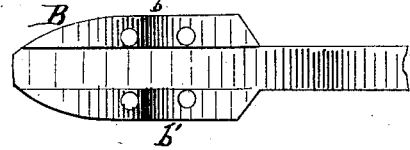
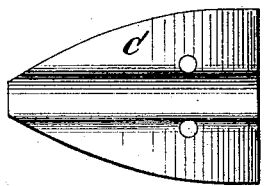
WITNESSES:
G. Mathys
A. W. S. Cart.
INVENTOR:
Moses F. White
BY
ATTORNEYS.

UNITED STATES PATENT OFFICE.

MOSES F. WHITE, OF DOUGLASSVILLE, TEXAS, ASSIGNOR OF ONE-FOURTH HIS RIGHT TO AUGUSTUS J. BLANKENSHIP, OF SAME PLACE.

IMPROVEMENT IN PLOWS.

Specification forming part of Letters Patent No. 153,646, dated July 28, 1874; application filed March 31, 1874.

CASE B.

*To all whom it may concern:*

Be it known that I, MOSES F. WHITE, of Douglassville, in the county of Cass and the State of Texas, have invented a new and Improved Plow; and I do hereby declare that the following is a full, clear, and exact description of the same, reference being had to the accompanying drawing, forming a part of this specification, in which—

Figure 1 represents a perspective view of plow-standard with my improvements applied. Fig. 2 is a face view of the foot of the standard. Fig. 3 is a plan view of the under side of the shovel or share.

The object of my invention is to provide an improved plow for cultivating cotton or other crops which are grown in rows or drills of the requisite distance apart.

The improvement consists in the arrangement of a plate or share with an adjustable bar which forms what is commonly designated the "point," and a grooved standard having lateral flanges, forming a broad, flat foot, to which the share is attached, as hereinafter described.

In the drawing, the curved standard A—which is adapted to be attached to the under side of a plow-beam by means of bolts in a well-known manner—is grooved or channeled lengthwise on the upper side, and has a broad foot, B, formed by lateral flanges $b$ $b'$, in which are one or more transverse rows of holes, two holes in each row. The shovel, share, or plow-plate C, which has the usual form or outline, is correspondingly grooved on the under side, and has a single transverse row of holes, coinciding in position with those in the foot of the standard. These holes receive screw-bolts $a$ $a$, by which the plate or shovel C is secured to the foot B, and whose adjustment permits the adjustment of the shovel higher or lower. By the arrangement of the holes in a line transversely of the shovel, the latter is more firmly secured to the standard-foot than by the arrangement heretofore employed. The steel bar D is curved on the arc of a circle correspondingly to the curve of the face of the standard, and beveled or sharpened at its lower end to adapt it to act as a point for the shovel. It is secured in the groove or channel between the shovel and foot B, and may be readily clamped in any desired adjustment, so as to project more or less beyond the point of the shovel by means of the share C and screw-bolts $a$ $a$.

I have made application for separate Letters Patent on the plow-standard.

I do not claim arranging and securing an adjustable bar in the groove of a plow standard; but

What I claim is—

The combination of the foot B of the standard with the bar D and the plate or share C, the same being secured by bolts $a$ $a$, arranged as shown and described, for the purpose specified.

MOSES F. WHITE.

Witnesses:
A. W. HART,
SOLON C. KEMON.